(12) United States Patent
Baehrle-Miller et al.

(10) Patent No.: US 9,068,613 B2
(45) Date of Patent: Jun. 30, 2015

(54) METHOD FOR OPERATING A PARKING BRAKE OF A VEHICLE

(75) Inventors: Frank Baehrle-Miller, Schoenaich (DE); Dieter Blattert, Kirchheim/Neckar (DE); Simon Hauber, Freiberg am Neckar (DE); Tobias Putzer, Bad Friedrichshall (DE)

(73) Assignee: ROBERT BOSCH GMBH, Stuttgart (DE)

( * ) Notice: Subject to any disclaimer, the term of this patent is extended or adjusted under 35 U.S.C. 154(b) by 273 days.

(21) Appl. No.: 13/511,903

(22) PCT Filed: Oct. 7, 2010

(86) PCT No.: PCT/EP2010/065003
§ 371 (c)(1),
(2), (4) Date: Sep. 20, 2012

(87) PCT Pub. No.: WO2011/064032
PCT Pub. Date: Jun. 3, 2011

(65) Prior Publication Data
US 2013/0001027 A1    Jan. 3, 2013

(30) Foreign Application Priority Data

Nov. 25, 2009  (DE) .......................... 10 2009 047 127

(51) Int. Cl.
| F16D 65/18 | (2006.01) |
| F16D 121/02 | (2012.01) |
| F16D 121/24 | (2012.01) |
| F16D 123/00 | (2012.01) |
| F16D 125/40 | (2012.01) |

(52) U.S. Cl.
CPC ............ *F16D 65/18* (2013.01); *F16D 2121/02* (2013.01); *F16D 2121/24* (2013.01); *F16D 2123/00* (2013.01); *F16D 2125/40* (2013.01)

(58) Field of Classification Search
CPC ............ F16D 2125/40; F16D 2123/00; F16D 2127/06; B60T 17/16
USPC .......................................................... 701/70
See application file for complete search history.

(56) References Cited

U.S. PATENT DOCUMENTS

| 5,979,619 | A * | 11/1999 | Rump ........................... 188/353 |
| 6,019,436 | A * | 2/2000 | Siepker ........................... 303/13 |
| 6,311,808 | B1* | 11/2001 | Halasy-Wimmer et al. . 188/72.6 |
| 6,971,485 | B1* | 12/2005 | Sherman, II .................. 188/72.7 |
| 7,370,735 | B2* | 5/2008 | Gilles et al. .................. 188/72.7 |
| 7,434,669 | B2* | 10/2008 | Halasy-Wimmer et al. .. 188/171 |
| 7,681,961 | B2* | 3/2010 | Nonaga et al. ................ 303/155 |
| 7,744,166 | B2* | 6/2010 | Leiter et al. ..................... 303/20 |

(Continued)

FOREIGN PATENT DOCUMENTS

| CN | 1668860 | 9/2005 |
| CN | 101304908 | 11/2008 |

(Continued)

*Primary Examiner* — Thomas Irvin
(74) *Attorney, Agent, or Firm* — Kenyon & Kenyon LLP

(57) ABSTRACT

A method for operating a parking brake of a vehicle, in particular of a motor vehicle, which parking brake operates in the superposition mode, the brake force of the parking brake being applicable by two different force-generating actuators mutually supporting one another in the superposition mode. It is provided that the force-generating, in particular pressure-generating, actuator is activated for support even before the superposition.

15 Claims, 3 Drawing Sheets

(56) References Cited

U.S. PATENT DOCUMENTS

| | | | |
|---|---|---|---|
| 7,753,178 B2* | 7/2010 | Ohtani et al. | 188/72.7 |
| 8,069,961 B2* | 12/2011 | Watada | 188/72.8 |
| 8,322,798 B2* | 12/2012 | Kondo et al. | 303/20 |
| 8,348,023 B2* | 1/2013 | Sakashita et al. | 188/72.1 |
| 8,521,388 B2* | 8/2013 | Baehrle-Miller et al. | 701/70 |
| 2006/0267402 A1* | 11/2006 | Leiter et al. | 303/20 |
| 2007/0062769 A1* | 3/2007 | Noh | 188/265 |
| 2007/0068746 A1* | 3/2007 | Chittka | 188/72.6 |
| 2007/0158148 A1* | 7/2007 | Ohtani et al. | 188/158 |
| 2011/0042171 A1* | 2/2011 | Knechtges | 188/106 F |
| 2011/0224880 A1* | 9/2011 | Baehrle-Miller et al. | 701/70 |
| 2012/0205202 A1* | 8/2012 | Baehrle-Miller et al. | 188/106 P |
| 2012/0245816 A1* | 9/2012 | Blattert et al. | 701/70 |
| 2013/0056315 A1* | 3/2013 | Bieltz et al. | 188/106 P |
| 2013/0213746 A1* | 8/2013 | Poertzgen et al. | 188/72.6 |
| 2013/0228402 A1* | 9/2013 | Leibfried et al. | 188/72.1 |
| 2013/0231839 A1* | 9/2013 | Baehrle-Miller et al. | 701/70 |
| 2013/0333988 A1* | 12/2013 | Bieltz et al. | 188/152 |
| 2013/0338896 A1* | 12/2013 | Baehrle-Miller et al. | 701/70 |

FOREIGN PATENT DOCUMENTS

| | | |
|---|---|---|
| DE | 101 50 803 | 5/2003 |
| DE | 10 2005 051082 | 5/2007 |
| DE | 10 2007 029927 | 1/2009 |

* cited by examiner

METHOD FOR OPERATING A PARKING BRAKE OF A VEHICLE

FIELD OF THE INVENTION

The present invention relates to a method for operating a parking brake of a vehicle, in particular of a motor vehicle, which parking brake operates in the superposition mode, the brake force of the parking brake being applied via two different force-generating actuators, which mutually support one another in the superposition mode.

BACKGROUND INFORMATION

Parking brakes of this type and methods for operating same are understood. A parking brake is operated to secure a vehicle at a standstill. A parking brake of this type, which operates in the superposition mode, is acted on, to generate the brake force using a mechanical actuator on the one hand and using a hydraulic actuator on the other hand. The two actuators contribute proportionally to the brake force, in particular the clamping force of a disk brake. The forces of the two actuators are added up to yield the total force. The known parking brake has a brake piston, which is acted on by both actuators. For securing the parking brake, the electromechanical actuator shifts the brake piston in the direction of the brake disk, so that, for the superposition, hydraulic fluid of the hydraulic actuator may also act on the brake piston, which moves a little bit out of the caliper unit due to the displacement. Due to the displacement of the brake piston by the electromechanical actuator, the hydraulic working space for the hydraulic fluid in the caliper unit is increased. Due to the volume increase, the pressure of the hydraulic fluid in the caliper unit or in the associated brake circuit is reduced, which is compensated for by the subsequent flow of hydraulic fluid from both a reservoir and the brake circuit itself. However, a minimum time is required for a new pressure equilibrium to be established due to flow resistances in the brake circuit (lines, valves, main brake cylinders, viscosity of the brake fluid, etc.). Due to these circumstances, it may happen that the required hydraulic fluid volume for the pressure support is not supplied in a timely manner. Furthermore, the drive of the electromechanical actuator may be operated in the blocking range for an unnecessarily long period of time, which leads to an increased load on the associated electrical/electronic components.

SUMMARY OF THE INVENTION

The method according to the present invention for operating the parking brake of the vehicle, in particular of the motor vehicle, which parking brake operates in the superposition mode in which the brake force of the parking brake is applicable via the two different force-generating actuators, which mutually support one another in the superposition mode, the force-generating, in particular pressure-generating, actuator for support being activated even before the superposition to prevent or reduce the pressure drop. In this case, there is no pressure drop that is mentioned above or there is no substantial pressure drop, thus resulting in optimally short actuating times. Through activation of the actuator mentioned above, the hydraulic medium will subsequently flow into the volume increase created by the displacement of the brake piston immediately, i.e., simultaneously with the movement of the brake piston. Furthermore, the load profile for the drive of the other actuator is improved and there is also less demand on the other electrical and electronic devices.

According to one refinement of the exemplary embodiments and/or exemplary embodiments of the present invention, it is provided that a hydraulic actuator is used as the one first actuator.

An electromechanical actuator may be used as the other second actuator.

The actuator performing the support may be the hydraulic actuator, i.e., the parking brake may be secured with the aid of the second electromechanical actuator, the first actuator, configured as a hydraulic actuator, being added in a supporting manner during this operation.

It is advantageous if the hydraulic pressure of the first actuator is supplied by a hydraulic pump and the power boost of the hydraulic pump occurs upon reaching a predefinable start-up working point of a first drive of the first actuator. After starting the first drive, it therefore warms up; the hydraulic pump driven by it may already supply a hydraulic fluid pressure upon reaching the start-up working point, the hydraulic fluid pressure then causing a rapid influx of the hydraulic fluid into the increased volume created by the displacement of the brake piston.

One refinement of the exemplary embodiments and/or exemplary embodiments of the present invention provides for the first drive to be activated as a function of an electric voltage characteristic and/or a rotational speed characteristic of a second drive, which drives the second actuator. Consequently, the first drive, which belongs to the hydraulic actuator, is driven as a function of the state of the second drive, which drives the second actuator. The second drive may be an electric drive, which has the electric voltage characteristic and/or rotational speed characteristic mentioned above, when activated. The first drive is activated when a certain working point in the voltage characteristic and/or rotational speed characteristic has been reached.

As already mentioned with regard to the second drive, it may be configured as an electric drive. An electric drive may also be used for the first drive, i.e., for driving the hydraulic actuator, in particular its hydraulic pump.

According to one specific embodiment of the present invention, it is provided that the period of time between activation and superposition is determined as a function of temperature. The temperature used may be the temperature of the above-mentioned hydraulic fluid of the hydraulic actuator and/or the outside temperature. The temperature has a direct effect on the viscosity of the hydraulic fluid, in particular the brake fluid, thus influencing the wake flow time of hydraulic fluid for the brake piston displacement mentioned above. The procedure described above takes into account the viscosity, which is different at different temperatures, by selecting the time period mentioned above to be longer or shorter.

The exemplary embodiments and/or exemplary embodiments of the present invention also relate to a control unit including an arrangement which is configured to perform the preceding method.

The drawings illustrate the present invention on the basis of one exemplary embodiment.

DETAILED DESCRIPTION

Figure 1:
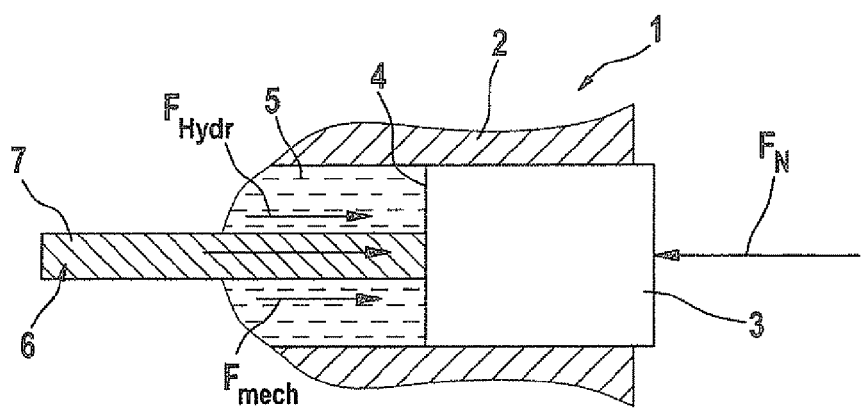
FIG. 1 shows a schematic view of a parking brake of a vehicle operating in the superposition mode.

FIG. 1 shows in a schematic diagram an area of a parking brake 1 of a motor vehicle (not shown). Parking brake 1 has a caliper unit 2, in which a brake piston 3 is guided longitudinally displaceably. Brake piston 3 may be acted on by a hydraulic fluid 5 on its one side 4, a force $F_{Hydr}$ being applied through the pressure of hydraulic fluid 5. Furthermore, a mechanical force $F_{mech}$ may act on side 4 of brake piston 3, the two forces $F_{Hydr}$ and $F_{mech}$ mentioned above superimposing on one another, resulting in a superposition mode, and jointly shifting the piston to the right, where there is a brake disk of parking brake 1 (not shown in FIG. 1), which is acted on by a brake force $F_N$ accordingly. FIG. 1 shows that mechanical force $F_{mech}$ may be generated by an electromechanical actuator 6 because the schematic diagram shows a spindle drive 7.

Figure 2:
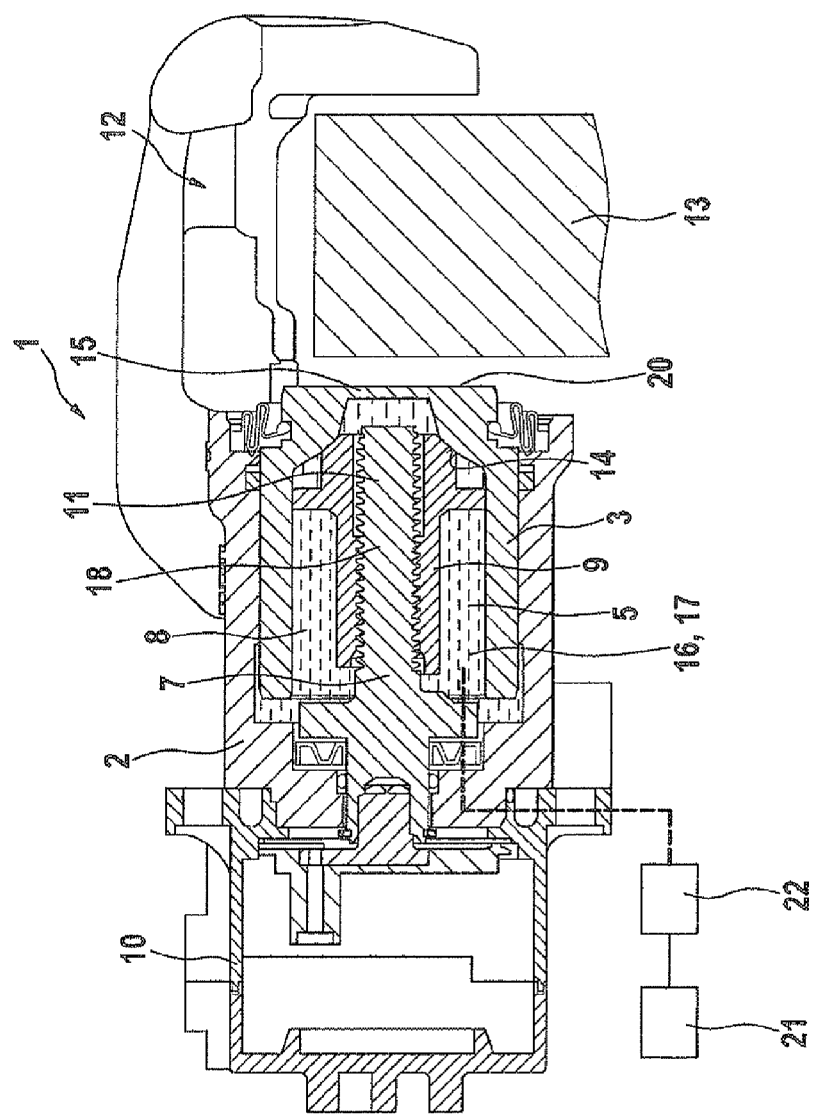
FIG. 2 shows a sectional view through a parking brake according to FIG. 1.

FIG. 2 elucidates FIG. 1 by illustrating structural features. Brake piston 3, which is longitudinally displaceably supported in caliper unit 2, is configured to be pot-shaped, a nut 9 of spindle drive 7 mentioned above being located in interior 8 of the pot. Nut 9 is situated in interior 8 of the pot to be longitudinally displaceable but is not rotatable and is screwed onto a threaded rod 11, which may be set into rotation by an electric drive 10. Threaded rod 11 and nut 9 form spindle drive 7 mentioned above. The outside circumference of a brake disk 13, which is braked when brake piston 3 moves to the right, i.e., when its outside 20 strikes brake disk 13, protrudes into a brake caliper 12 of parking brake 1. To secure parking brake 1, electric drive 10 is operated so that threaded rod 11 rotates and therefore nut 9 strikes inside 14 of pot bottom 15 of pot-shaped brake piston 3. Since this inside 14 of pot bottom 15 is also acted on by hydraulic fluid 5 (brake fluid), the displacement of brake piston 3 results in an increased hydraulic working space. This requires hydraulic fluid 5 to flow after it as quickly as possible. Care is taken according to the exemplary embodiments and/or exemplary embodiments of the present invention to ensure this rapid wake flow. It is clear from all of this that the brake force of parking brake 1 is, on the one hand, acted on by a first actuator 16 which is configured as a hydraulic actuator 17, hydraulic actuator 17 being formed by the hydraulic fluid/brake piston configuration. On the other hand, a second actuator 18 which is configured as an electromechanical actuator 6 is provided, which includes the spindle drive/brake piston configuration. No brake pads or the like are specifically mentioned in the preceding because the configuration of a parking brake 1 is believed to be essentially understood. To ensure the rapid wake flow of hydraulic fluid 5 as mentioned above, another drive, which is configured as an electric drive 21, is activated early on, as a function of the function parameters of electric drive 10 mentioned above. To this extent, electric drive 21 represents a first drive, and electric drive 10 represents a second drive of parking brake 1. First electric drive 21 drives a hydraulic pump 22, which pressurizes hydraulic fluid 5. Brake piston 3 is acted upon by the pressure of the hydraulic fluid, so that it is displaced in the direction of brake disk 13, as mentioned above. Consequently, the two actuators 16 and 18 operate in the superposition mode, i.e., they both make a contribution toward applying the brake force.

Figure 3:
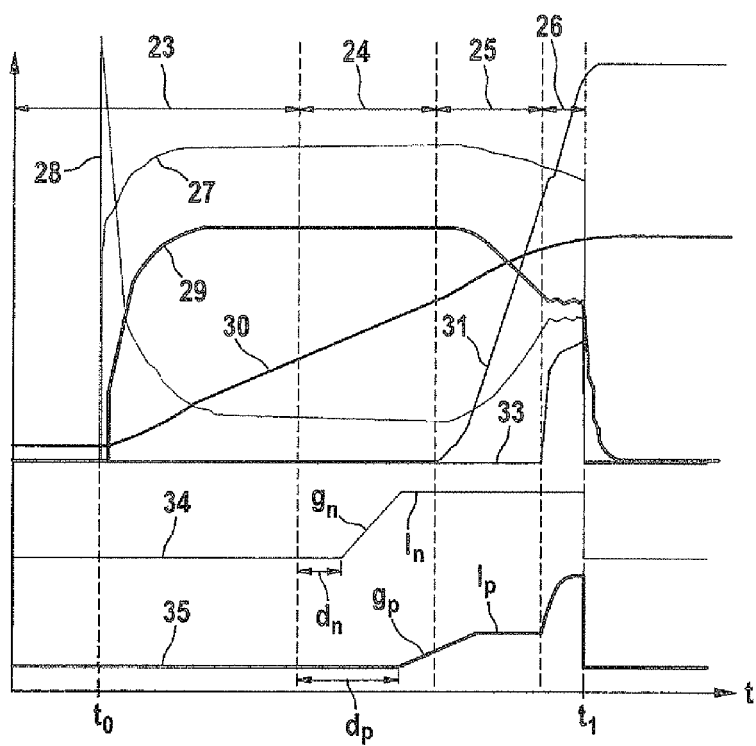
FIG. 3 shows a time diagram of several variables during operation of the parking brake according to FIGS. 1 and 2.

The diagram in FIG. 3 illustrates the operation described above. The sequences are subdivided into four consequent time phases 23, 24, 25 and 26. Point in time t is represented on the abscissa of the diagram in FIG. 3. If parking brake 1 is to be secured, electric drive 10 is connected to an electric voltage 27. The voltage characteristic is labeled with reference numeral 27 in FIG. 3. At point in time to the drive is activated, so that electric voltage 27 on electric drive 10 increases suddenly during time phase 23 and then results in a maximal voltage plateau in time phase 23 in the form of an arc. At point in time $t_0$ the electric current of electric drive 10 increases in a peak and then drops again very rapidly, leading to a working current level during time phase 23 in an arc shape. Motor rotational speed 29 of electric drive 10 increases very rapidly just after activation point in time to, reaching an upper level within time phase 23. Furthermore, it may be seen from FIG. 3 that distance 30 traveled by nut 9 becomes progressively greater, increasing continuously within time phase 23, starting at point in time $t_0$. FIG. 3 shows the characteristic curve 31 of mechanical brake force $F_{mech}$ which has a uniform level during time phase 23 because nut 9 has not reached brake piston 3. The hydraulic pressure is labeled as 33, i.e., this is the pressure in the hydraulic system containing hydraulic fluid 5. During time phase 23 here again there is a constant level. Curve 34 shows the characteristic curve of the rotational speed demanded of first electric drive 21, and curve 35 shows the characteristic curve of the pressure demand in the hydraulic system, i.e., in first actuator 16.

As is apparent from FIG. 3, brake force 31 of electromechanical actuator 6 increases only after the end of first time phase 23 and second time phase 24 at the start of third time phase 25, i.e., nut 9 begins to press brake piston 3 against brake disk 13 here. It is likewise apparent that rotational speed demand 34 has already increased with respect to first electric drive 31 in second time phase 24 and remains at an elevated level after a rising ramp. At the end of the rising ramp of rotational speed demand 34, the pressure demand 35 in the hydraulic system increases in the form of a ramp up to a uniform level, which remains constant until the end of third time phase 25. The superposition mode already mentioned occurs in fourth time phase 26, i.e., brake force 31 of electromechanical actuator 6 is supported by the brake force applied by the hydraulic system. It is obvious here that hydraulic pressure 33 drastically increases at the start of fourth time phase 26, reaching its highest level at the end of time phase 26. Brake force 31 of the electromechanical system also increases further during time phase 26, reaching its highest level at the end of this phase. The system is turned off at point in time $t_1$, i.e., the two drives 10 and 21 are taken out of operation, so that hydraulic pressure 33 drops back to the original level and electromechanical actuator 6 assumes a locking function of parking brake 1, so that parking brake 1 remains tightened to an adequate extent. It is clear from the preceding that actuator 16 has already been activated to support actuator 18 prior to the superposition to create a pressure drop in the hydraulic system, or the pressure drop reduction, in the hydraulic system, i.e., the increase in hydraulic working space formed by the displacement of brake piston 3 performed by electromechanical actuator 6, is immediately filled up with hydraulic fluid 5 through early activation of hydraulic actuator 17, so the required clamping force on a parking brake 1 may be built up very rapidly.

A regulating and/or activating concept for parking brake 1 may be obtained, allowing load-optimized activation of the electrical components, the load optimization allowing the use of small-sized electrical components. An estimate of the stiffness of caliper unit 2, which is usually performed, is influenced only insignificantly despite the early activation of electric drive 21 of hydraulic pump 22 according to the present invention. Due to the exemplary embodiments and/or exemplary embodiments of the present invention, there is an optimally short adjustment time for brake piston 3 of parking brake 1. Furthermore, the load profile of electric drive 10 and of electrical control units, which are optionally to be used, may be minimized.

The motor rotational speed of electric drive 10 may be evaluated during first time phase 23 and second time phase 24, and thus the point in time for engaging hydraulic pump 23 is defined in this way. To minimize the noise of electric drive 21 and/or of hydraulic pump 22, first drive 21 is operated at the lowest possible rotational speed.

The support, i.e., the superposition in time phase 26, may be performed in such a way that the caliper stiffness of caliper unit 2 of the parking brake, which was ascertained in time phase 25, is used to adjust the target clamping force with the aid of distance control (see also page 9, first paragraph).

It is provided in particular that the pressure demand during pre-control occurs as a function of temperature. The temperature of hydraulic fluid 5, i.e., of the brake fluid, may be measured for this purpose. With the pressure control according to the exemplary embodiments and/or exemplary embodiments of the present invention, i.e., with the fastest possible filling of the increasing hydraulic working space, the temperature of hydraulic fluid 5 may be taken into account by using characteristic lines, for example, which act on the pressure control. The drop in temperature results in the wake flow of hydraulic fluid 5 being slowed down, so that the pressure control according to the present invention must compensate for this accordingly.

A fixed value may also be assumed for the temperature of hydraulic fluid 5, so that then a constant viscosity of hydraulic fluid 5 may also be assumed. Accordingly, an expected pressure drop is obtained when there is a displacement of brake piston 3 with the aid of electromechanical actuator 6, which is counteracted by the pressure control according to the present invention. In particular, the cost of a pressure sensor may be saved.

It is also possible to assume that the temperature of the brake fluid, i.e., hydraulic fluid 5, correlates with the outside temperature, and it is possible to counteract the expected pressure drop accordingly via the pressure control according to the present invention. In particular, the cost of a pressure sensor may be saved.

The following should also be mentioned with regard to individual time phases 23 through 26. The motor start occurs in time phase 23, i.e., electric drive 10 is started. The starting current peak shown in FIG. 3 has already been pointed out. At the same time, motor rotational speed 29 changes very rapidly because the motor is accelerated. This is derived from characteristic line 29, representing the motor rotational speed. Whereas electric current 28 drops very drastically in time phase 23, as time progresses, electric current 28, electric voltage 27 and/or motor rotational speed 29 are evaluated and an instantaneous motor constant $K_M$ and a motor resistance $R_M$ are calculated. These may be done by using iterative estimation methods in particular. Electric drive 10 is operated without load in the second phase, i.e., time phase 24, so that a no-load current is established. The size of the no-load current is a measure of the no-load torque of electric drive 10. In phase 3, i.e., time phase 25, force builds up on parking brake 1. With the help of parameters $K_M$, $R_M$ ascertained in the preceding time phases 23 and/or 24 and with the help of the no-load torque of electric drive 10 and the instantaneous values for current 28, voltage 27 and motor rotational speed 29, the actual motor torque of electric drive 10 may be estimated by using mechanical and electrical motor differential equations. Using a known gear reduction (gear, leadscrew pitch of spindle drive 7) and efficiencies of the mechanical chain of individual components (rotation translation), the clamping force of parking brake 1 may thus be estimated. Furthermore, the spring stiffness of the brake caliper of caliper unit 2 is also ascertained in time phase 25. The increase in brake force in comparison with the distance traveled by brake piston 3 is evaluated here. If the required, electromechanically adjusted, clamping force $F_{mech}$ is reached, instantaneous electric current 28, the calculated pitch (spring stiffness) and the instantaneous clamping force are stored temporarily. The superposition is regulated in the fourth phase, i.e., time phase 26. The motor current of electric drive 10 is regulated in such a way that the superposition remains constant in the remaining course. Caliper unit 2 is released due to the pressure provided, the release torque of electric drive 10 thus remains largely constant, and the additional brake caliper enlargement is detected by rotation of electric drive 10 (conversion of rotation to translation). Together with the caliper stiffness ascertained in time phase 25, this yields the clamping force:

$$F_{cfinal} = \eta_{mech} \cdot Fc_{mech} + \eta_{hydr} \cdot F_{hydr}$$

$$F_{cfinal} = \eta_{mech} \cdot Fc_{mech} + \eta_{hydr} \cdot S_{ch}(j) \cdot C_{cal}$$

$F_{cfinal}$—clamping force after superposition
$\eta_{mech}$—mechanical efficiency
$\eta_{ydr}$—hydraulic efficiency
$Fc_{mech}$—clamping force supplied electromechanically
$F_{hydr}$—clamping force supplied hydraulically
$S_{ch}(j)$—additional distance traveled during superposition
$C_{cal}$—spring stiffness of the brake caliper This operation is continued until the required distance of brake piston 3 has been run through. Subsequently, electromagnetic actuator 6 and hydraulic actuator 17 are turned off. Direct detection of the pressure is thus not necessary and the accuracy of the pressure setting is also adjusted.

The method presented here is used in particular when the vehicle is parked on a slope (>20%, for example). It is possible to ascertain the slope by using a position sensor. The present invention prevents a vacuum from being established in the hydraulic system, in particular. This should not occur even at low temperatures, i.e., at very cold outside temperatures.

FIG. 3 also shows with regard to rotational speed demand 34 and pressure demand 35 that activation time $d_n$ of drive 21 for hydraulic pump 22, gradient $g_n$ of the startup of drive 21 and a target rotational speed $l_n$ of drive 21 are defined as a function of the instantaneous voltage situation. Similarly, the activation time of pressure setting $d_p$, pressure buildup gradient $g_p$ and target pressure $l_p$ are defined.

If the regulation of drive 21 is determined essentially by the feed rate of brake piston 3, the pressure demand is primarily determined by the pressure drop in the hydraulic system. In a first approximation, a voltage dependence may be assumed for the feed rate. If the speed of drive 10 is known (measurement by Hall element, for example), the real feed rate may be used to calculate the required volume flow. The pressure drop depends to a great extent on the temperature in addition to the flow rate, as already mentioned above. The following strategies are possible for the pressure demand: the temperature of hydraulic fluid 5 (brake fluid) is known (temperature sensor) and may be used to estimate the viscosity and to adapt the pressure demand to the expected flow behavior (pressure drop). If the temperature of hydraulic fluid 5 is not known, it is assumed that the brake fluid is always very cold, e.g., −20° C. For this case, the pressure drop is known and the pressure demand may be set accordingly. It is also possible to proceed as follows if the temperature of the brake fluid (hydraulic fluid 5) is not known. It is assumed that the temperature of the brake fluid correlates with the outside temperature with a defined tolerance. Thus, the outside temperature would determine the level of the pressure demand.

The goal of the exemplary embodiments and/or exemplary embodiments of the present invention is to always have the shortest possible activation of hydraulic pump 22 with the lowest possible pump rotational speed and a low pressure in order to minimize the additional noise generated.

What is claimed is:

1. A method for operating a parking brake of a motor vehicle having a brake piston, the method comprising:
activating a first force-generating actuator, which is a pressure-generating actuator, for support even before a superposition mode to prevent a pressure drop or to reduce the pressure drop;
wherein the parking brake operates in the superposition mode, and the brake force of the parking brake is applicable via the first force-generating actuator having a first drive and a second force-generating actuator having a second drive, which mutually support one another against the brake piston in the superposition mode and the first drive is activated as a function of at least one of an electric voltage profile and a rotational speed profile of a second drive, which drives the second actuator.

2. The method of claim 1, wherein a hydraulic actuator or a pneumatic actuator is used as a first one of the two different force-generating actuators.

3. The method of claim 1, wherein an electromechanical actuator is used as a second one of the two different force-generating actuators.

4. The method of claim 1, wherein a hydraulic actuator is used as the force-generating actuator for support.

5. The method of claim 1, wherein electric drives are used as the drives.

6. A method for operating a parking brake of a motor vehicle having a brake piston, the method comprising:
activating a force-generating actuator, which is a pressure-generating actuator, for support at a time period before a superposition mode to prevent a pressure drop or to reduce the pressure drop;
wherein the parking brake operates in the superposition mode, and the brake force of the parking brake is applicable via two different force-generating actuators which mutually support one another against the brake piston in the superposition mode and the time period between activation and superposition is defined as a function of at least one of a temperature of a hydraulic fluid of the hydraulic actuator and an outside temperature is used as the temperature.

7. A control unit for operating a parking brake of a motor vehicle having a brake piston, comprising:
an activating arrangement to activate a first force-generating actuator, which is a pressure-generating actuator, for support before a superposition mode to prevent a pressure drop or to reduce the pressure drop;
wherein the parking brake operates in the superposition mode on the brake piston, and the brake force of the parking brake is applicable via the first force-generating actuator having a first drive and a second force-generating actuator having a second drive, which mutually support one another against the brake piston in the superposition mode and the first drive is activated as a function of at least one of an electric voltage profile and a rotational speed profile of a second drive, which drives the second actuator.

8. The control unit of claim 7, wherein a hydraulic actuator or a pneumatic actuator is used as a first one of the two different force-generating actuators.

9. The control unit of claim 7, wherein an electromechanical actuator is used as a second one of the two different force-generating actuators.

10. The control unit of claim 7, wherein a hydraulic actuator is used as the force-generating actuator for support.

11. The control unit of claim 7, wherein electric drives are used as the drives.

12. The control unit of claim 7, wherein a hydraulic actuator or a pneumatic actuator is used as a first one of the two different force-generating actuators, and wherein an electromechanical actuator is used as a second one of the two different force-generating actuators.

13. The control unit of claim 12, wherein electric drives are used as the drives.

14. The control unit of claim 12, wherein the hydraulic actuator is used as the force-generating actuator for support.

15. The control unit of claim 14, wherein electric drives are used as the drives.

* * * * *